Aug. 18, 1931.        D. P. DAVIES        1,819,640
TRACTOR
Filed Feb. 26, 1930
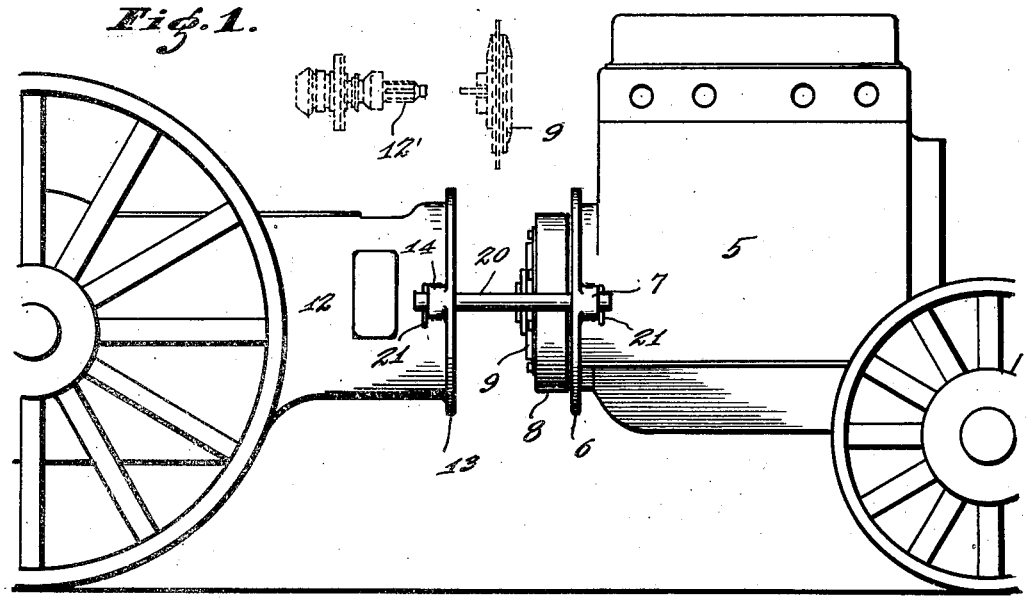
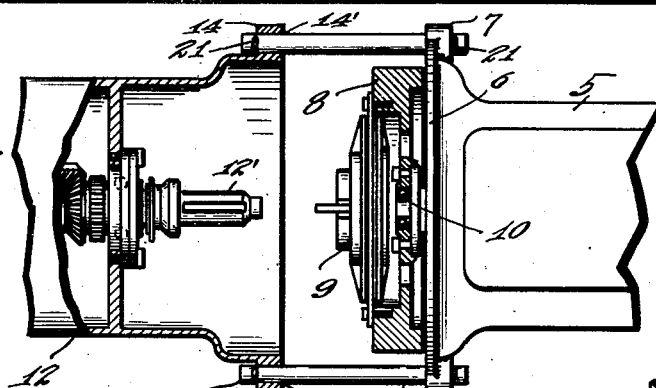
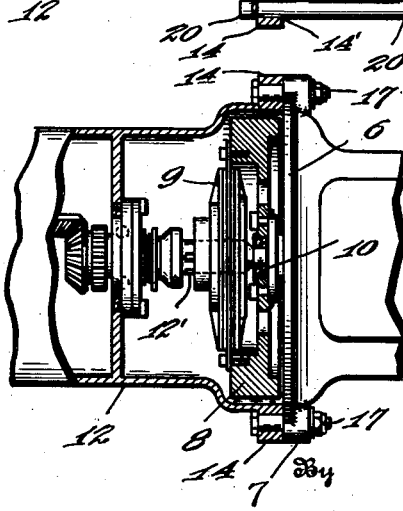
Inventor
DAVID P. DAVIES,
James A. Walsh,
By
Attorney Patented Aug. 18, 1931

1,819,640

UNITED STATES PATENT OFFICE

DAVID P. DAVIES, OF RACINE, WISCONSIN, ASSIGNOR TO J. I. CASE COMPANY, OF RACINE, WISCONSIN, A CORPORATION

TRACTOR

Application filed February 26, 1930. Serial No. 431,620.

In the type of tractors embodying detachably connected elements such as a unitary engine-block and crank-case, and a transmission-housing, each of which are mounted upon supporting wheels, it becomes necessary to split the tractor, that is, separate its elements, in order to obtain access to mechanisms therein, and because of the weight and unwieldy character thereof it has been difficult and laborious to reconnect such bodies, as ordinarily they must be temporarily supported, usually by heavy blocking and the like, and considerable maneuvering is required to assure the proper alinement absolutely essential to obtain accurate assemblage and connection of interior operating parts such as the clutch, crank-shaft, driveshaft and transmission, which are engaged in sequence. It is my object, therefore, to provide means whereby a tractor may be split and separated sufficiently to obtain access to and removal of certain of the interior mechanisms for inspection, repair or otherwise, while at the same time the disconnected heavy elements thereof will be sustained in position to be accurately reassembled without the necessity of employing supporting means of the character referred to, and which may be readily accomplished by a single attendant, as will hereinafter more fully appear.

In the accompanying drawings, forming part hereof, Figure 1 is a side elevation showing the crank-case and transmission of a tractor in disconnected relation and embodying my improvement; Fig. 2, a plan partly in section of a portion of the tractor showing the power plant and transmission divided and mechanisms therein separated; Fig. 3, a fragmentary plan showing the tractor elements and operating mechanisms connected; and Fig. 4 is a fragmentary side elevation showing the manner of securing the tractor elements.

As indicated, in carrying out my invention two major elements are employed, that is, a cooperating power plant and transmission system, each enclosed in suitable housings adapted to be readily connected and disconnected for my purpose.

In said drawings, the numeral 5 indicates the power plant having a flange 6 at its rear end embodying bolt holes (not shown) for a purpose to appear, and which flange at its opposite sides is provided with keepers 7. The power plant, as is common, carries a flywheel 8 connected to a crank-shaft, in which wheel the clutch assembly 9 is mounted by the spigot bearing 10, all of which parts may be of any well known or preferred construction and arrangement.

The transmission housing 12 may be of any appropriate design and is provided with a flange 13 at its forward end of a character similar to the flange 6, which flange 13 embodies bolt holes (not shown), and keepers 14 at its opposite sides, which bolt holes and keepers are in alinement with those in the power plant flange, so that when the two tractor elements are brought together, as indicated in Fig. 4, they may be securely connected by bolts 16 passing through the flanges 6, 13, and the bolts 17 passing through the keepers 7, 14.

It frequently becomes necessary to disconnect the housings 5 and 12 when it is desired to change parts of or to remove the clutch assembly bodily as indicated by the dotted lines in Fig. 1, or to separate the clutch from the bevel-pinion shaft 12' as shown in Fig. 2, and the separating, reassembling and alining of these heavy tractor bodies, as ordinarily practiced, is not only exceedingly laborious but consumes considerable time, requiring the assistance of attendants to obtain and prop one or both elements with blocks, logs and the like which are not always readily available in fields and otherwise. By such method true alinement of the bodies when reassembling is troublesome and tedious, as the weight of the heavy elements causes the supports to sink in the earth unevenly so that said power plant 5 and transmission housing 12 become askew in relation to each other and consequently difficult to aline without considerable maneuvering, and it is essential that the power plant and transmission housings shall be joined accurately so that the crankshaft and comparatively delicate interior mechanisms such as the spigot bearing, clutch assembly, shaft 12' and the transmission which it drives, will be placed at once in absolute alinement without injury or destroying the nicety of fit of such parts. To obviate the difficulties referred to I simplify the method of separating and unifying the tractor elements by the employment of the keepers 7, 14, which are reamed, as at 14', Fig. 2, and the alining shafts 20 which are inserted therethrough. The reamed holes 14' for the reception of the alining shafts are also used as locating points or gauges for the boring of the transmission wall which receives the element 12' and also the bore for the crankshaft bearings, which bores are so located in such relation to the gauge holes that when the latter are registered and accurately coincide the bores of the transmission housing and crank-shaft bearings will likewise be in true alinement. In separating the tractor elements the bolts 17 are removed from the keepers and the alining shafts 20 inserted therethrough, and the bolts 16 then withdrawn from the flanges 6, 13, when the tractor elements may be pulled apart and sustained by the alining shafts, as indicated in Fig. 1. The movement of said elements away from each other is limited by pins 21 in the ends of the alining shafts, and they become separated a sufficient distance to allow ready access to the clutch assembly to remove the same completely together with the shaft 12', as indicated by dotted lines in Fig. 1, or such assembly may be withdrawn from connection with shaft 12' as indicated in Fig. 2. When reassembling the tractor elements the alining shafts 20 serve as guides and supports by which one or the other of the elements may be properly guided and prevented from wobbling to insure that the mechanisms contained in each element will at once become accurately and positively alined and engaged with each other, without repeated efforts, but as commonly practiced frequent attempts are required when the power plant is entirely disconnected and drawn away from the transmission, or vice versa, and supported by blocking, as the latter settles in the earth through the weight of the tractor elements and which condition thus destroys true alinement between them when reassembling. The difficulties stated are not only overcome by my improvement but the disassembling and reassembling of the tractor elements and the interior mechanisms thereof may be readily accomplished by a single attendant without the blocking commonly used, and by which means tackle or other especial equipment for the purpose is dispensed with. The holes through the bosses or keepers 7, 14, and the bolts 17 as well as the shafts 20, are much greater in diameter than the bolts 16 and holes therefor, and by providing enlargements of the character of said bosses or the equivalents thereof with holes of considerable length and diameter bearings of sufficient dimensions are formed therein to accommodate the heavy alining shafts 20 and maintain them in substantially tight fitting and straight position during the work of assemblage, and as the tractor parts are extremely weighty the heavy shafts will sustain them when separated without danger of bending or breaking.

I claim as my invention:

1. In a tractor, a power plant embodying a housing having bearings at each side thereof, a fly-wheel associated with the housing, a clutch assembly mounted in the fly-wheel, a transmission attachable to the power plant embodying a housing having bearings at each side thereof in registry with the bearings on the power plant, a bevel-pinion shaft in the transmission housing adapted to engage and be driven by the clutch, removable means in the bearings for normally securing the meeting ends of the power plant and transmission housings together, and alining shafts insertible through the bearings whereby when the removable means are withdrawn said power plant and clutch assembly may be disconnected from the transmission housing and bevel-pinion shaft respectively and the plant supported and guided by the alining shafts to reconnect said plant with the transmission housing and the clutch assembly with said shaft whereupon the alining shafts are withdrawn and the removable means replaced.

2. In a tractor, a power plant embodying a housing, a plurality of bosses on the housing having openings therethrough, a transmission housing attachable to the power plant, a plurality of bosses on the transmission housing having openings therethrough in registry with the bosses on the power plant removable means insertible in the bosses for normally securing the housings together, and removable alining shafts insertible through said bosses whereby when the removable means are withdrawn said housing may be separated and supported and guided by said alining shafts to be reassembled in alinement, said shafts having means for limiting the movement of the housings in relation to the shafts.

3. In a tractor, a power plant embodying a housing having bosses thereon, a transmission housing attachable to the power plant and having bosses thereon registering with the bosses on the power plant, bolts insertible through said bosses for normally retaining the housings together, and alining shafts removably insertible through said bosses when the bolts have been withdrawn whereby the housings may be separated and supported by the shafts and guided thereby to be reassembled in alinement and said shafts then removed and the housings reconnected by said bolts.

4. In a tractor, the combination of a power plant embodying a flanged housing, a transmission attachable to the power plant embodying a flanged housing adapted to be engaged with the power plant flange, enlarged registering bearings at opposite sides of the housings, removable means for normally securing the meeting ends of the housings together, and alining shafts insertible through said bearings whereby when the removable means are withdrawn said housings may be separated and supported and then guided by the alining shafts to be reassembled.

5. In a tractor, a power plant embodying a housing having bearings at each side thereof, a transmission attachable to the power plant embodying a housing having bearings at each side thereof in registry with the bearings on the power plant, removable means normally securing the meeting ends of the power plant and transmission housings together, and alining shafts insertible through said bearings when the removable means have been withdrawn therefrom whereby said housings may be separated, supported, and guided by said alining shafts to be reassembled, said shafts then removed and the removable securing means reinserted in said bearings.

6. In a tractor, a power plant having a flange on its end, a transmission housing having a flange on its end, bolts securing said flanged ends together, bosses associated with said flanges having registering openings therein, removable means insertible in the bosses for normally securing the housings together, and alining shafts removably insertible in the bosses whereby when said bolts and removable means are withdrawn said housings will be supported by the shafts when separated and while being reassembled.

7. In a tractor, a power plant embodying a housing, a transmission housing attachable to the power plant, means on the latter housing having a reamed opening constituting a bore locating gage, apertured means on the power plant housing in registry with said gage, removable means normally securing said gage and apertured means together, and alining shafts insertible through said gage and apertured means when the removable means have been withdrawn therefrom whereby said housings may be separated and supported and guided by the alining shafts to be reunited and again secured by said removable means when said shafts have been withdrawn.

In testimony whereof I affix my signature.

DAVID P. DAVIES.